Feb. 12, 1946.   F. B. HALFORD   2,394,766
APPARATUS FOR TESTING THE AERODYNAMIC BALANCE OF AIRSCREWS
Filed Sept. 4, 1942   3 Sheets-Sheet 3
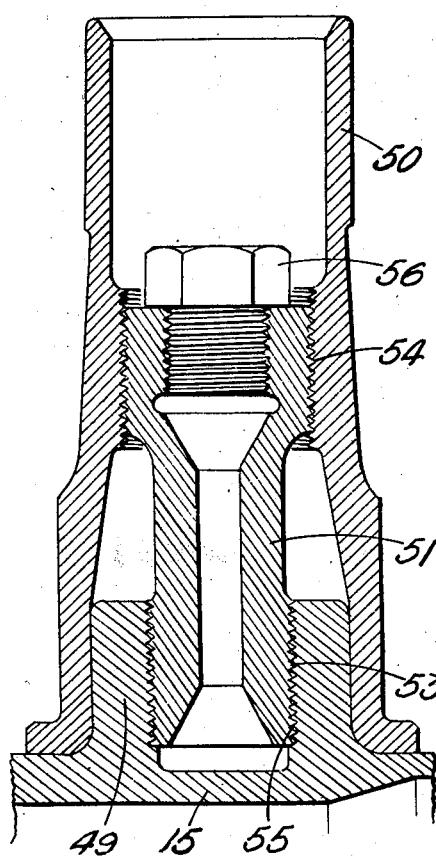
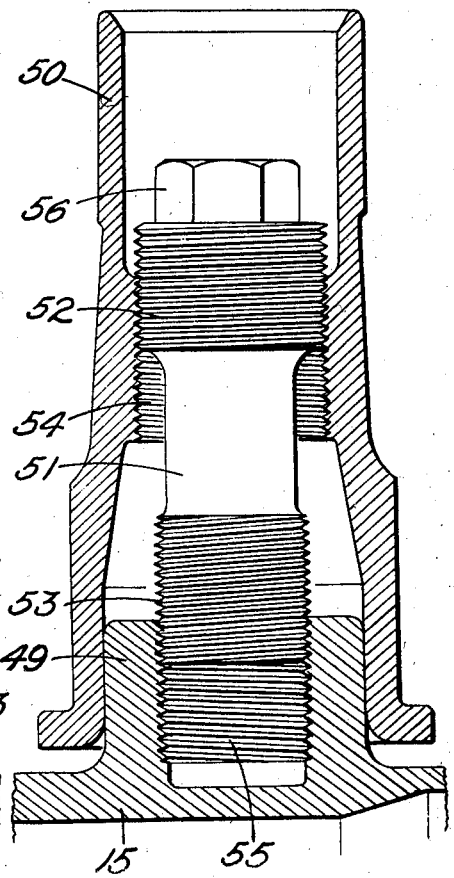

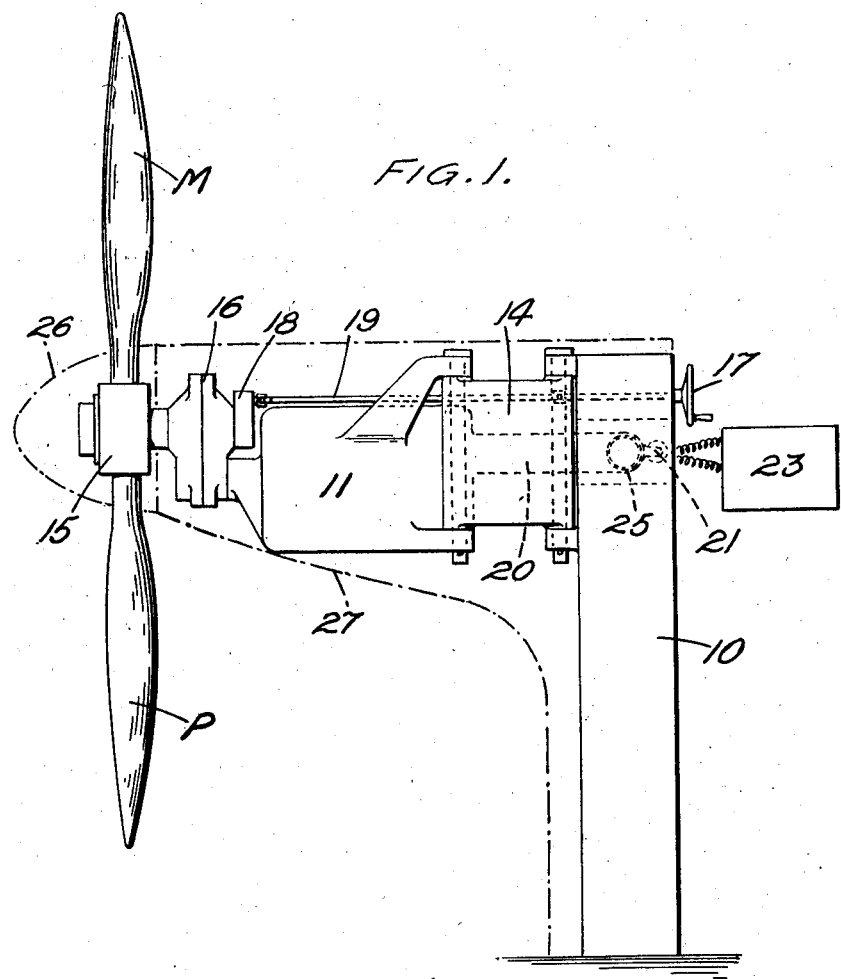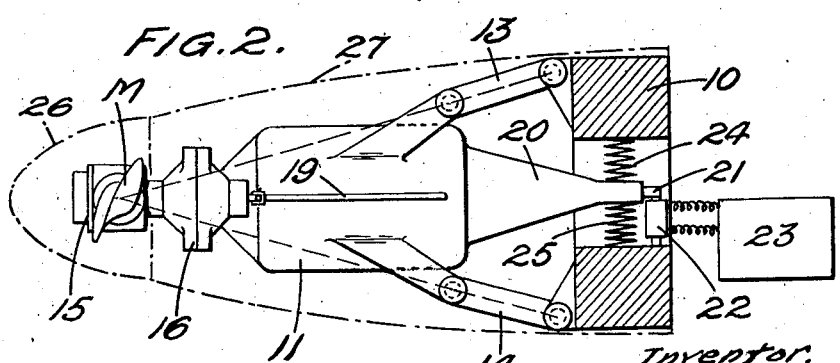

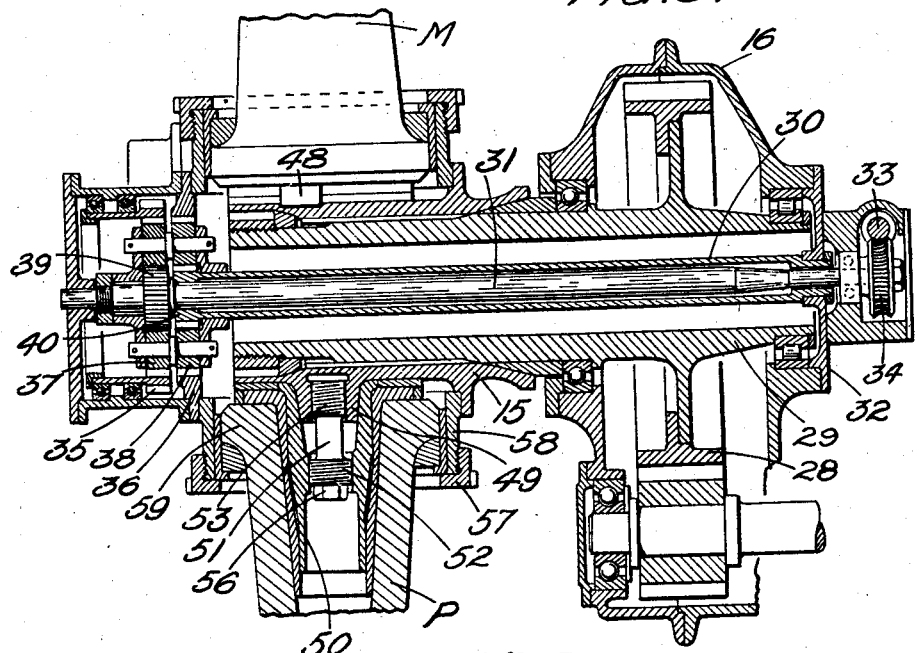
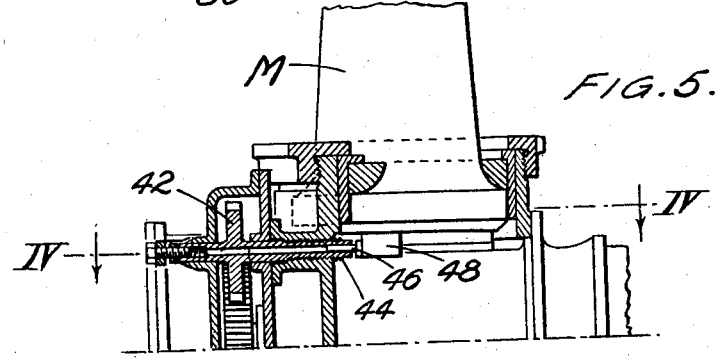
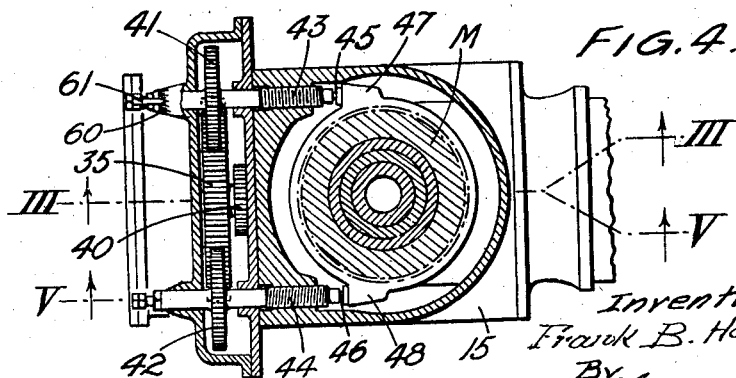

Patented Feb. 12, 1946

2,394,766

UNITED STATES PATENT OFFICE 2,394,766

APPARATUS FOR TESTING THE AERODYNAMIC BALANCE OF AIRSCREWS

Frank Bernard Halford, Hatfield, England, assignor to The De Havilland Aircraft Company Limited, Hatfield Aerodrome, England Application September 4, 1942, Serial No. 457,351
In Great Britain August 21, 1941

3 Claims. (Cl. 73—66)

This invention relates to apparatus for testing the aerodynamic balance of airscrews.

In modern high-performance aircraft it may sometimes occur that despite the fact that the airscrew may be effectively mass-balanced both statically and dynamically serious vibration may arise as a result of aerodynamic unbalance of the individual airscrew blades due to minute inequalities in their effective pitch, producing differences in their thrusts and hence a couple on the aircraft. Since the plane of action of the couple rotates with the airscrew its effect is the same as that of dynamic mass unbalance of an airscrew which is statically balanced.

It is an object of the invention to provide apparatus for testing the aerodynamic balance of airscrew blades, it being understood that the data afforded by the test may be an indication of the degree of balance, or lack of it; the setting at which the best condition of balance is achieved for an individual airscrew blade, or for the blades of an airscrew embodying a plurality; or the blade relationship of any given blade or airscrew to a master blade.

The present invention consists in apparatus for testing the aerodynamic balance of airscrew blades and includes an airscrew hub adapted and arranged for the reception of one or more production blades to be aerodynamically balanced against a master blade or a plurality of master blades; means for driving the airscrew hub, the assembly of driving means and hub being mounted with freedom to oscillate about an axis transverse to the axis of the hub; means for measuring or indicating the oscillations imparted to the said assembly in operation thereof; means for adjusting the pitch setting of at least one of the blades; and means readily operable to ensure secure engagement and later disengagement relative to the hub of a blade to be tested. The oscillations of the frame preferably occur in opposition to resilient means afforded by springs or the like. The pitch-changing means may operate in any convenient manner, and preferably are capable of being actuated to vary the pitch during actual operation of the apparatus. The pitch-changing means may be connected to the master blade and/or with the production blade to be tested. If the pitch-changing means is (or are) connected with the master blade, the pitch-change control mechanism is less likely to be deranged by continual insertion and removal of the production blades to be tested against the master; while, furthermore, the shank of the master blade can then be different from the shank of the production blade in order to achieve considerable simplification of the pitch-changing mechanism.

In order that it may be clearly understood and readily carried into effect, the invention is hereinafter described with reference to the accompanying diagrammatic drawings, of which:

Figure 1 is a fragmentary side elevation partly in section illustrating airscrew blade balance testing apparatus according to the invention;

Figure 2 is a plan view corresponding to Figure 1;

Figure 3 is a sectional elevation taken longitudinally through the hub drive and pitch-change mechanism of the apparatus according to the present invention the line of section being indicated at III—III in Figure 4;

Figure 4 is a section on the line IV—IV of Figure 5;

Figure 5 is a section on the line V—V of Figure 4;

Figure 6 illustrates one method of blade attachment; the parts being shown in Figure 6 in the fully-engaged position; while Figure 7 illustrates the blade-attachment means in a position of initial engagement.

Referring first to Figures 1 and 2 of the drawings, the apparatus is mounted on a rigid stand or base 10 which supports the electric motor 11 by means of the links 13 and 14, pivotally mounted at each end. The motor 11 drives the airscrew hub 15 through the reduction gear-box 16. The hub is arranged to mount a master blade, represented by the reference letter "M," and a production blade, represented by the reference letter "P"; and in accordance with the usual variable pitch airscrew practice pitch-changing means are provided. Although the pitch-changing means may be arranged to operate either on the master or on the production blades, in the embodiment illustrated the pitch-changing means operates on the master blade. Pitch-change control is effected by operation of the hand-wheel 17 coupled to the pitch-change worm drive gear-box 18 through the shaft 19. It is important to note that to ensure the machine being sufficiently sensitive to aerodynamic unbalance it is essential that all extraneous vibrations should be minimized by having the structure sufficiently rigid, and by paying careful attention to all bearings. It is noteworthy too that the motor-and-hub suspension illustrated is one so arranged that unbalanced centrifugal forces in the plane of the rotating airscrew disc shall not tend to vibrate the airscrew. This is incident to the fact that the axial lines of the links 13 and 14 meet at the center of the hub, as indicated by dash lines in Figure 2, thus neutralizing oscillations at such hub.

Extending back from the motor housing is a projecting arm 20 having virtually a stylus, as indicated by the reference numeral 21, which influences the electrical pick-up device 22 electrically connected to the recording and/or indicating apparatus, as represented by the box 23, the stylus being resiliently supported on the springs 24 and 25. The airscrew hub 15, in accordance with airscrew practice, is preferably faired by the spinner 26; whereas the remainder of the apparatus is faired by the cowling 27. The electrical pickup and indicator device is of conventional construction being previously shown in other patents and for sale on the open market.

Referring now to Figures 3 to 5, it will be seen that the reduction gear-box housing 16 includes the driven gear wheel 28 fast on the shaft 29 on which the airscrew hub 15 is splined. The master blade M is mounted in the hub in any convenient manner and preferably is essentially controllable in pitch; whereas, as has been previously stated, the production blade P need not be mounted for pitch variation.

In regard to the pitch-change apparatus, the shafts 30 and 31 are normally held stationary, the shaft 30 being keyed to the end plate 32; whereas the shaft 31 is operated for rotation by the worm 33 engaging the worm wheel 34; the worm 33 itself being driven through bevel gearing from the shaft 19, shown in Figures 1 and 2. The toothed annuli 35 and 36 normally rotate with the airscrew, the pinions 37 and 38 idling freely. Movement of the worm 33 rotates the sun 39 which causes relative displacement of the annulus 35 with respect to the airscrew hub through the medium of the pinions 37 the spindles of which are constrained to a uniform motion by the pinions 38 acting in the annulus 36 on the sun 40. The relative movement of the annulus 35 rotates the wheels 41 and 42 mounted fixedly on the spindles 43 and 44, having respectively right- and left-hand screws working in the hub 15; and the arrangement is therefore such that for pitch-change operation the spindle 43 is moved one way, whereas the spindle 44 moves in the reverse sense. The spindles 43 and 44 have adjustable end tappets 45 and 46 which bear on the projections 47 and 48, respectively, extending from the root mounting of the master blade M.

One method of mounting the blades is illustrated with reference to Figures 6 and 7. As shown, the airscrew drive shaft is provided with projecting stubs 49, and the spider arm 50 is placed on the stub in an initial position, which may be approximately that shown in Figure 7. A differential bolt 51 is then inserted through the hollow spider arm and the bolt has an upper thread 52 and a lower thread 53, which threads respectively engage the internal thread 54 of the spider arm and the internal thread 55 of the stub. A head 56 is provided on the differential bolt 51 so that the latter may be screwed in by a box spanner. The threads 53 and 55 are steeper in pitch than the threads 52 and 54, with the result that when the threads 53 and 55 pick up on rotation of the differential bolt by means of a box-spanner operating in the slot 56, the differential action of the threads forces the spider arm onto the stub until it reaches the position shown in Figure 6.

It will be seen by reference to Figures 3 and 5 that the airscrew blades are received directly on the spider arms 50, being held against displacement radially outwards by the castellated end cap 57 threaded onto the barrel projections 58 surrounding the blade roots; and usual packing and/or bearing means are provided between the enlarged root portion 59 and the flange of the castellated end cap 57.

In operation of the apparatus, if the arrangement is such that the pitch-change mechanism operates on the master blade, the procedure is to set the production blade by hand to the required nominal pitch, and then to run the apparatus up to its resonant speed. The pitch of the master blade is then adjusted until the minimum vibration is obtained, thus establishing the difference in pitch between the master and the production blade that is necessary to achieve the best aerodynamic balance possible in the circumstances. Alternatively, if the pitch-changing mechanism acts on the production blade, the procedure is to adjust the angle of the production blade, and then to run the airscrew up through the resonant range, noting the amount of unbalance as indicated by the recording apparatus. The blade angle is adjusted again and the airscrew run through the resonant range; the operation being repeated until the optimum setting is obtained. For giving a visual indictaion of the setting for the production blade which achieves the minimum unbalance as compared with the master blade, it is convenient to provide the verrier fitting 60 on a forward projection of the spindle 43 in order to give a reading against the pointer 61.

Having found the amount and direction of pitch-adjustment required, the usual procedure to be followed is marking of the production blade in such a way that by reference to a standard marking the blade can be mounted in a production airscrew hub in its best condition of aerodynamic balance. Thus, a plurality of blades which have been tested can be quickly and easily inserted into a production hub in such setting that the airscrew will have the minimum degree of aerodynamic unbalance due to pitch errors which is possible in the circumstances.

Although in the foregoing description reference has been made to one master blade and one production blade, it will be realized that the hub may be arranged to locate more than two blades. Thus, for instance where a hub is intended for the reception of three blades, it is always preferable to employ two carefully-matched master blades against which a single production blade is to be tested.

It will be appreciated that the gyroscopic couple caused by the racking motion of the airscrew, motor and frame on the supporting trunnions tends to produce additional vibrating disturbances which, under certain conditions, may reduce or even destroy the effectiveness of the apparatus as a means for detecting aerodynamic unbalance of the airscrew blades. This action depends to a large extent upon the ratio between the moment of inertia of the airscrew about a diametral axis and the moment of inertia of the airscrew motor and frame assembly about the trunnion axis, and can be reduced to negligible proportions by arranging that the moment of inertia of the airscrew, motor and frame about the trunnion axis is a large multiple of the moment of inertia of the airscrew about a diametral axis. If required, additional mass can be added to the motor or frame for the purpose of making this ratio sufficiently large.

The apparatus may be arranged with its axis in any desired plane, but generally speaking it will be vertical or horizontal. The apparatus need not necessarily be run at the same speed or with the same blade angles as will be employed when the airscrew is in service, for it will be appreciated that the driving means in the balance-testing apparatus according to the present invention need not necessarily have the same power output as an aircraft engine.

It may be possible in some cases to calibrate the apparatus so that instead of turning the blades until the balance is obtained, the indicating or recording means may be calibrated against master airscrews or blades at various pitch settings, such calibrations being usable for estimating pitch errors of production blades.

What I claim is:

1. Apparatus for testing the aerodynamic balance of airscrew blades comprising an airscrew hub to receive a production blade to be aerodynamically balanced against a master blade; means for driving the airscrew hub, the assembly of driving means and hub being mounted with freedom to oscillate about an axis transverse to the axis of the hub; means for indicating the oscillations imparted to the said assembly during operation of the hub; and means for selectively adjusting the pitch setting of at least one of the blades during operation of the hub.

2. A construction as defined in claim 1, wherein the pitch-adjusting means comprises pitch-change gearing, elements driven by the gearing in relatively reversed directions and means on the root mounting of one of the blades in contact with said elements to rotate the root mounting of one of the blades in selective direction to effect a pitch change of that blade in the operation of the apparatus.

3. Apparatus for testing the aerodynamic balance of airscrew blades comprising an airscrew hub to receive a production blade to be aerodynamically balanced against the master blade, means for driving the airscrew hub, the assembly of driving means and hub being mounted for freedom to oscillate about an axis transverse to the axis of the hub, means for indicating the oscillations imparted to the said assembly during operation of the hub, gearing correlated to impart a pitch setting adjustment of at least one of the blades, and members operated by the gearing to impart rotative movement to the mounting of one of the blades during operation of the hub, whereby to adjust the pitch setting of that blade.

FRANK BERNARD HALFORD.